April 25, 1950          J. A. JARBOE          2,505,405
ELECTRICALLY HEATED LUNCH BOX
Filed May 13, 1949          2 Sheets-Sheet 1
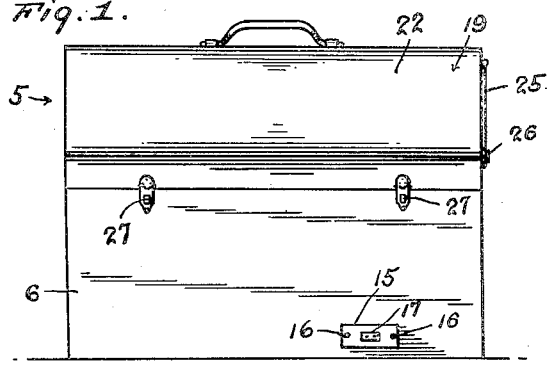
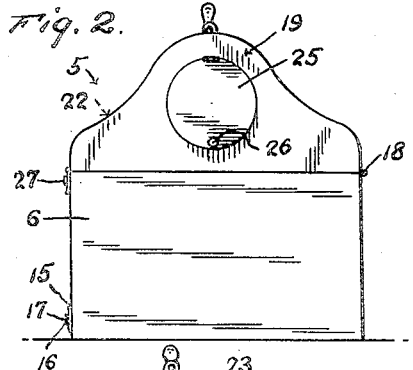
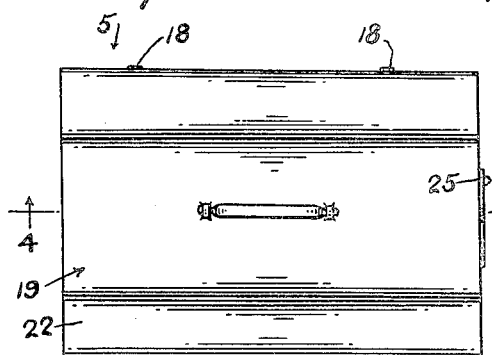
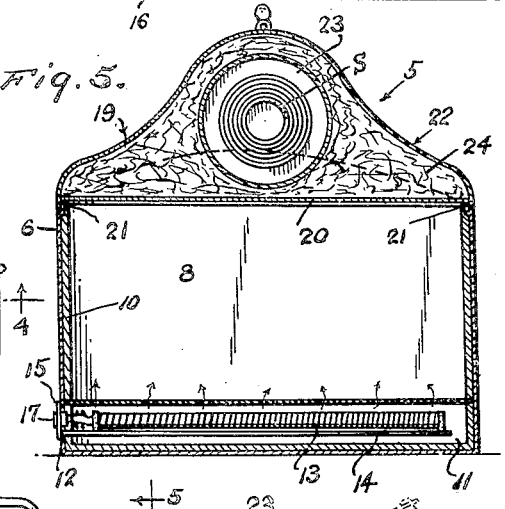
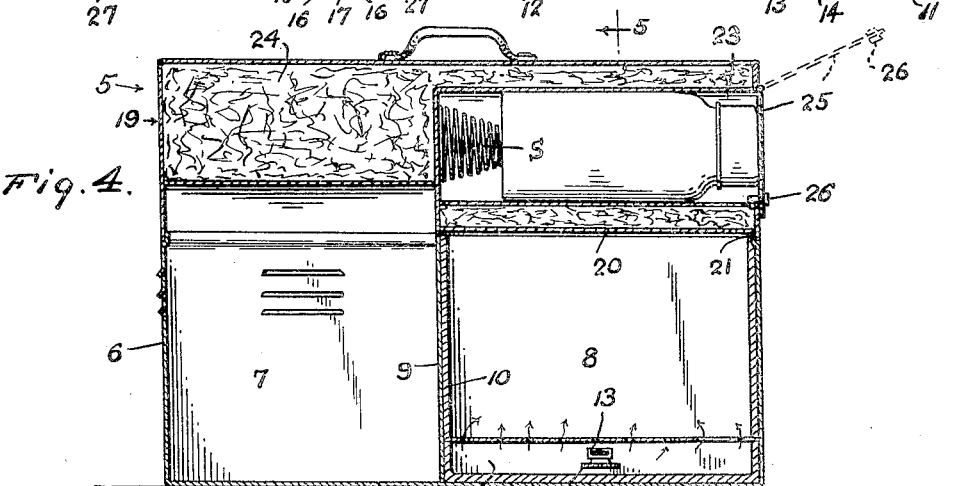
INVENTOR.
John A. Jarboe
BY
L. B. James
Attorney.

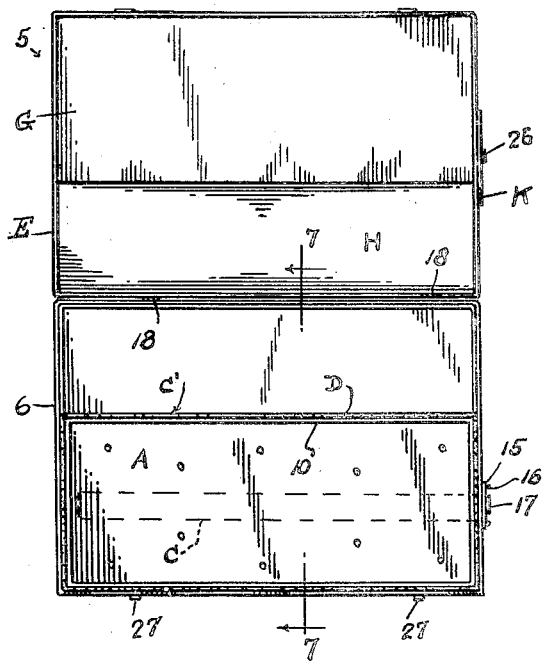
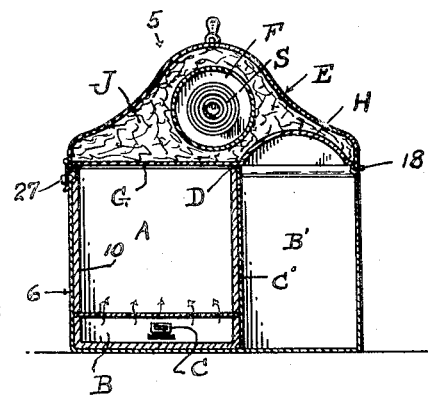
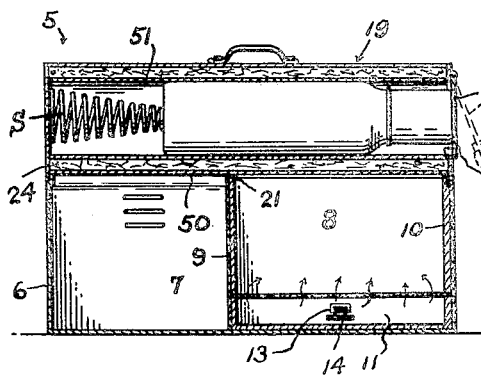
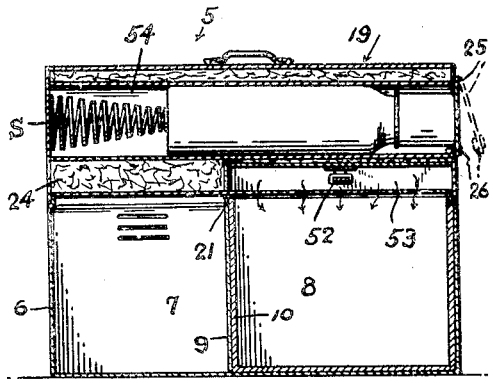

Patented Apr. 25, 1950

2,505,405

UNITED STATES PATENT OFFICE 2,505,405

ELECTRICALLY HEATED LUNCH BOX

John A. Jarboe, Fort Scott, Kans.

Application May 13, 1949, Serial No. 93,015

2 Claims. (Cl. 219—19)

This invention relates to food receptacles and more particularly lunch boxes.

The primary object of this invention resides in the provision of a lunch box adapted to be connected to an electric circuit at the workman's place of employment so as to slowly heat or cook certain of the food therein during the period between his arrival at work and lunch period.

Another object of this invention resides in the provision of a lunch box adapted to contain food to be heated in a compartment which is insulated from other compartments therein containing cool food.

A further object of this invention resides in the provision of a lunch box adapted to contain cool and heated foods in separated lower compartments and a bottled beverage in a compartment formed in the cover thereof.

A still further object of this invention resides in the particular construction of the food heating compartment.

Aside from the aforesaid objects, this invention resides in the particular construction of the cover.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Fig. 1 is a front view of the lunch box.

Fig. 2 is an end view thereof.

Fig. 3 is a plan view of the lunch box.

Fig. 4 is a longitudinal sectional view taken approximately on line 4—4 of Fig. 3.

Fig. 5 is a cross sectional view taken approximately on line 5—5 of Fig. 4.

Fig. 6 is a plan view of a modified form of the lunch box showing the cover in open position.

Fig. 7 is a cross sectional view taken approximately on line 7—7 of Fig. 6.

Fig. 8 is a longitudinal sectional view of another form of the lunch box.

Fig. 9 is a similar view with the heating unit in the cover of the lunch box.

In the present illustration of this invention the numeral 5 designates, in general, a substantially rectangular lunch box consisting of a body portion 6 divided into a ventilated cool food compartment 7 and a warm food compartment 8 which is insulated from the walls of the body portion 6 and partition 9 by sheets of heat resisting material 10; however, it is within the purview of this invention to separate the warm food compartment from the walls of the body portion and cool food compartment by any well known heat resisting means.

Disposed below said warm food compartment is a heat compartment 11 having an opening 12 in its front wall through which is inserted an elongated 700 ohm electric heating unit 13 mounted on an elongated platform 14 which is secured to the inner surface of a face-plate 15 removably secured over the opening 12 by screws 16 and having an electric plug receiving socket 17 connected to the heating unit 13 in the usual manner.

Secured to the body portion of the lunch box as by suitable hinges 18 is a hollow cover 19 having a flat bottom 20 over the warm food compartment which, when in closed position thereover, rests on a sealing gasket 21 disposed around the upper edges of said warm food compartment to retain heat therein. The upper wall 22 of said cover gradually curves inward from its front and rear sides on approximately O-Gee lines and has an elongated cylindrical compartment 23 formed therein for reception of a thermos bottle. Said cylindrical compartment 23, including the wall over the heat compartment, is insulated from the heat compartment by a suitable heat resisting material 24 and is provided with a door 25 which is hinged over the open end of said compartment 23 and provided with a suitable lock 26 at its lower end to prevent unauthorized access thereto.

In order to secure the lunch box against unauthorized access to the food therein when connected to the electric circuit of the workman's place of employment while he is working at a remote post, the cover is secured to the body of the lunch box by a suitable lock 27.

That portion of the cover disposed over the cool food compartment preferably extends upwardly beyond the plane occupied by the upper edge of the body portion of the lunch box in order to permit storage of various kinds of foods therein such as apples, oranges, jars of preserves and other foods which do not require heating.

In the modified form of the invention as shown in Figs. 6 and 7, the body portion of the lunch box is provided with an elongated insulated warm food compartment A disposed over a heating compartment B having a 700 ohm heating unit C therein which is connected to a source of electricity similarly to that of the preferred form of the lunch box. Said warm food compartment is disposed parallel to an elongated cool food compartment B' with the partition C' therebetween and the upper edge of the warm food compartment is provided with a sealing gasket D to prevent heat from escaping from the warm food compartment into the cool food compartment.

Disposed over said compartments is a hinged hollow cover E having a thermos bottle compartment F therein and a flat lower wall G covering the warm food compartment adjacent an arched lower wall H disposed over the cool food compartment. Said hollow cover is packed with suitable heat resisting material J for the purpose heretofore set forth and provided with a locked door K hinged on compartment F as shown in the preferred form of the invention.

In order to partially eject the thermos bottle from the compartments in the cover of the lunch box, an expansion coil spring S is secured to the inner end wall thereof and compressed by the thermos bottle when the door is locked against its outer end.

In the modified form of the lunch box shown in Fig. 8 of the drawings, the cover is provided with a flat bottom 50 and cylindrical compartment 51 throughout its length.

In Fig. 9 of the drawings, the warm food compartment 8 is heated by a heating unit 52 similar to that heretofore set forth disposed in a compartment 53 in the lower portion of the cover and insulated from the cylindrical compartment 54 therein.

With this invention fully set forth, it is manifest that a lunch box is provided whereby a workman can carry warm and cool foods and a beverage, such as coffee, tea and the like, to work and thereafter subject the food to be heated to a constant slow heat from the time he arrives at work until his lunch period.

Having thus described my invention, what I claim and desire to protect by Letters Patent is:

1. An electric lunch box comprising, a substantially rectangular body portion having an opening in its front wall adjacent the bottom thereof, a substantially warm food compartment in one end of the body portion, a substantially rectangular cool food compartment in the other end of the body portion, a substantially rectangular heat compartment beneath the warm food compartment, a face plate removably secured over the opening in the body portion, an inwardly extending platform secured to the inner surface of said face plate, an electric heating unit mounted on the platform beneath the warm food compartment, heat resisting material insulating the warm food compartment from the walls of the body portion and cool food compartment, a hollow cover hingedly connected to the body portion, a flat lower wall formed on said cover and overlying the open upper end of the warm food compartment, a sealing gasket disposed between the upper edges of the warm food compartment and flat wall of the cover, an arched lower wall formed on the cover and overlying the upper end of the cool food compartment, a substantially cylindrical compartment disposed in the upper portion of the cover and having its entrance at one end thereof, a hinged door over the open end of said cylindrical compartment, a lock on said door, an expansion coil spring secured to the inner end wall of the cylindrical compartment, heat resisting material disposed within the cover and insulating the cylindrical compartment from the warm food compartment, a lock securing the cover to said body portion, an electric socket secured to said face plate and electrically connected to the electrically heating unit, and an electric cord removably connecting the electric socket to a source of electricity.

2. An electrically heated lunch box comprising, an elongated body portion having an opening in the lower portion of one end thereof, an elongated warm food compartment in the front portion of the body portion, an elongated cool food compartment in the rear portion of the body portion, heat resisting material insulating the warm food compartment from the walls of the body portion and cool food compartment, a hollow cover hinged to the rear wall of the body portion, a flat lower wall formed on the cover and overlying said warm food compartment, a sealing gasket between the upper edge of the warm food compartment and said flat wall of the cover, an arched lower wall formed on the cover and overlying the cool food compartment, a cylindrical beverage bottle receiving compartment disposed in the cover, heat resisting material disposed in the hollow cover, a door hinged on one end of the cover and overlying the open end of said cylindrical compartment, an expansion coil spring secured to the inner end wall of said cylindrical compartment, a lock on the door over the cylindrical compartment, a face plate removably secured over the opening of the body portion, an inwardly extending platform formed on the inner surface of said face plate, an electric socket secured to the face plate, an electric heating unit mounted on the platform and electrically connected to said electric socket, a lock securing the cover in closed position over the cool and warm food compartments, and an electric cord removably connecting the electric socket to a source of electricity.

JOHN A. JARBOE.

REFERENCES CITED

The following references are of record in the file of this patent:

UNITED STATES PATENTS

| Number | Name | Date |
| --- | --- | --- |
| 1,979,222 | Goodwin | Oct. 30, 1934 |
| 2,187,196 | Douglass | Jan. 16, 1940 |
| 2,295,221 | King | Sept. 8, 1942 |